United States Patent [19]
Heaton

[11] 3,815,260

[45] June 11, 1974

[54] SIMULATED VEHICLE

[76] Inventor: Joe Heaton, 120 W. Washington, Tipton, Ind. 46072

[22] Filed: May 8, 1973

[21] Appl. No.: 358,233

[52] U.S. Cl............... 35/11, 116/28 R, 280/1.1 R, 340/61
[51] Int. Cl. ............................................. G09b 9/04
[58] Field of Search ...... 35/11, 25; 116/28 R, 28 A, 116/63 R, 63 P; 340/51, 61; 280/1.1 R, 1.1 A, 1.11 R, 1.11 A; 40/145 A

[56]  References Cited
UNITED STATES PATENTS

| | | | |
|---|---|---|---|
| 1,560,572 | 11/1925 | Hatton | 40/145 A |
| 2,334,539 | 11/1943 | Buchtel | 35/25 |
| 2,569,529 | 10/1951 | Kirk | 116/28 R |
| 2,706,462 | 4/1955 | Evans | 116/28 R |
| 2,797,922 | 7/1957 | Thompson et al. | 35/11 X |
| 2,798,451 | 7/1957 | Hund | 116/63 P |
| 2,803,920 | 8/1957 | Salosky | 280/1.11 R X |
| 3,022,846 | 2/1962 | Thompson | 280/1.11 R UX |
| 3,187,710 | 6/1965 | Wilfert | 116/28 R |
| 3,395,387 | 7/1968 | Durant | 340/61 |
| 3,416,484 | 12/1968 | Chapman | 116/28 R X |
| 3,478,311 | 11/1969 | Czingula | 340/61 X |
| 3,493,925 | 2/1970 | Brancale | 116/28 R X |
| 3,605,334 | 9/1971 | Genin | 46/240 |

Primary Examiner—Wm. H. Grieb

[57]  ABSTRACT

Automobile driver training, particularly a simulated vehicle which is impact resilient and, therefore, may be used as a teaching and scoring aid in parking instruction. The lightweight vehicle includes fore and aft resiliently suspended bumper elements, including electrical signalling means for scoring and signalling the driver-trainee upon collision impact.

10 Claims, 8 Drawing Figures

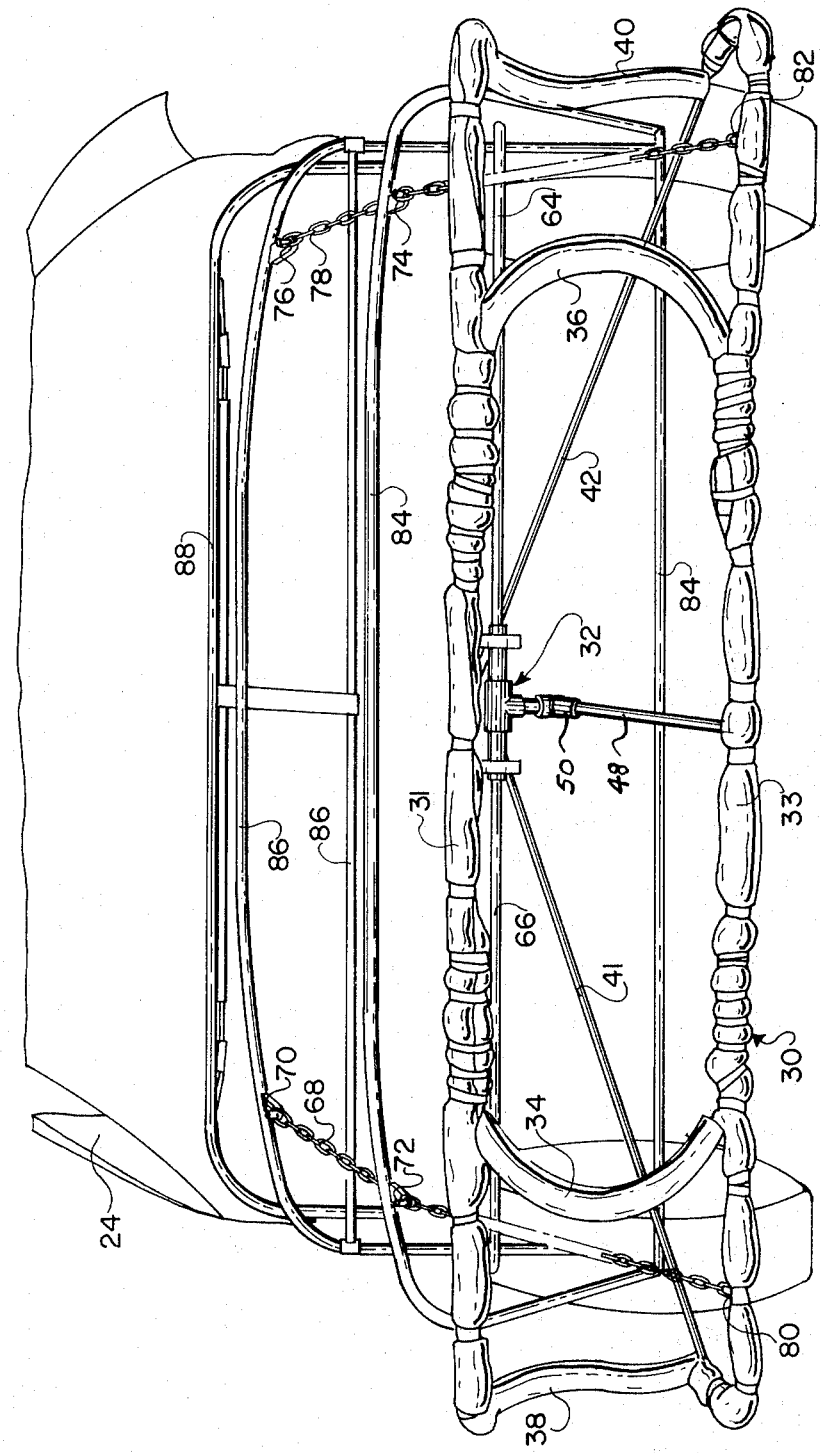

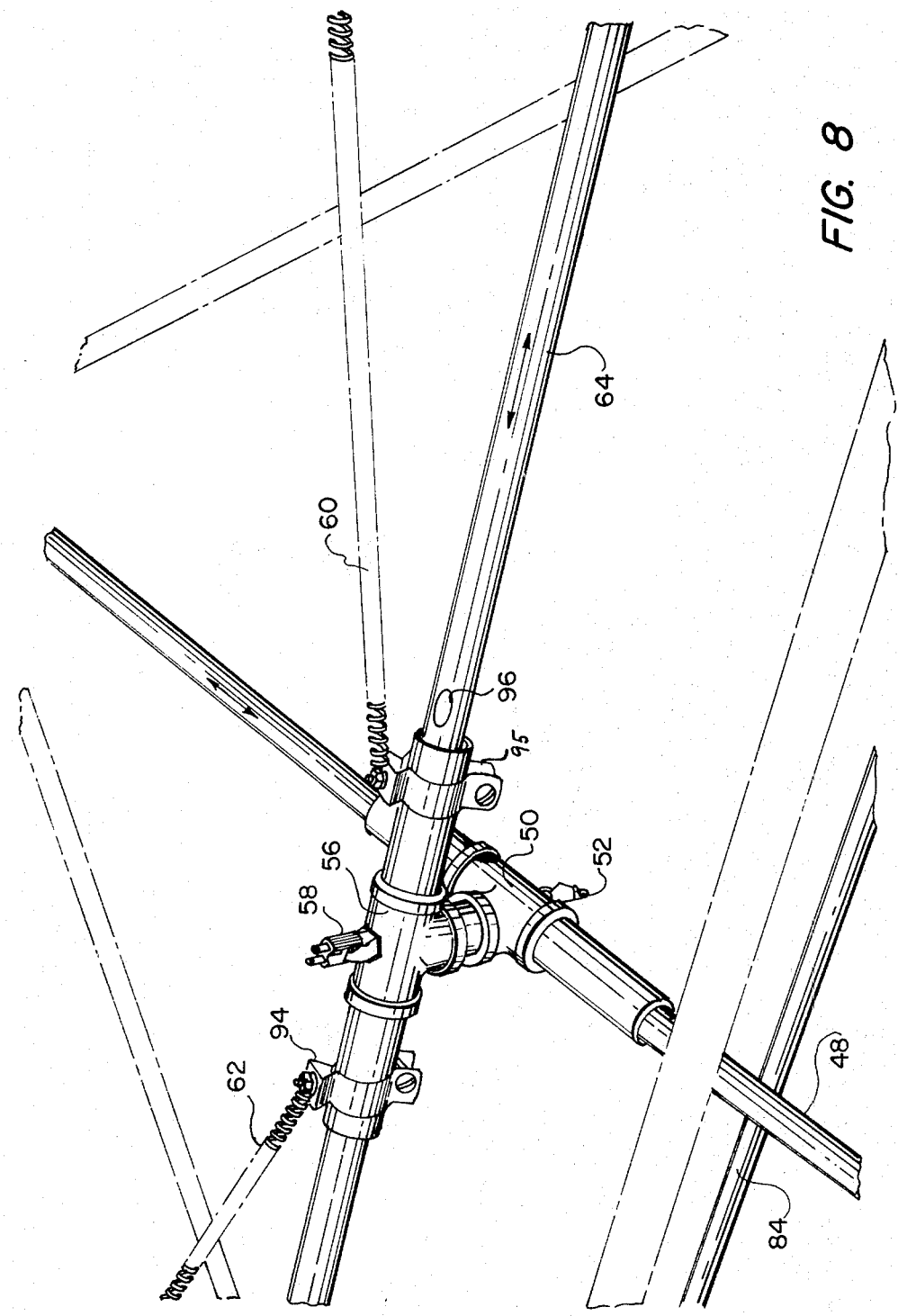

SIMULATED VEHICLE

CROSS REFERENCES TO RELATED APPLICATIONS

The present simulated vehicle may be used in the instruction of automobile parking and in connection with simulated curb devices, as disclosed in my co-pending application entitled Vehicle Parking Instruction and Scoring Curb Device (Ser. No. 411,114) filed Oct. 30, 1973.

BACKGROUND OF THE INVENTION

1. Field of the Invention

Automobile driver training, particularly parking. A great deal of recent attention has been given to driver training education at the high school level. Parking is taught by defining a parking space either between two conventional vehicles or by empty crude oil barrels, saw horses or the like. In the first case, where actual vehicles are employed to define the parking space, both the aft and fore ends of these vehicles, as well as the driver trainee's vehicle are jeopardized upon inaccurate parking and collision. In the case of using saw horses or crude oil barrels, the driver trainee's vehicle is frequently damaged by bumper or fender contact with these artificial aids.

2. Description of the Prior Art

Earlier inventors have addressed themselves to the problem of devising driver training aids which are either resilient upon impact or at the very least signal a scoring device upon impact. Such inventions include notably: U.S. Pat. Nos. CHAPMAN 3,416,484; HUND 2,798,451; CZINGULA 3,478,311; THOMPSON, et al. 2,797,922; HATTON 1,560,572; GENIN 3,605,334; KIRK 2,569,529; EVANS 2,706,462; BRANCALE 3,493,925; DURANT 3,395,387.

The Hund U.S. Pat. No. 2,798,451 shows a stanchion including a normally upright marker element held in place by spring means, adapted to permit the element to swing from its normal position upon contact with a vehicle. The patent to Chapman is generally similar in purpose and includes a cylindrical drum rotatably mounted on a column adapted upon rotation by vehicle contact to give an audible signal.

The patents to Durant, Kirk, Evans, Czingula and Brancale, show warning systems to indicate vehicle position or contact with respect to a garage with various types of signalling means, some of which are electrical.

The patents to Genin and Thompson are for toy vehicle instruction simulating apparatus.

The Hatton patent discloses a base construction for a floor mounted parking aid light or the like and is of general interest only.

The prior art does not suggest a simulated vehicle which is both collision resilient and capable of developing an electrical signal for scoring purposes.

SUMMARY OF THE INVENTION

According to the present invention the simulated vehicle includes a lightweight, portable frame and both front and back bumper elements which are resiliently suspended at either end of the frame. A flexible plastic or like cover may be stretched upon both the frame and the bumpers, so as to provide weather protection, as well as automobile appearance. The bumpers are mounted upon a yoke which is resiliently suspended from the frame and which engages both longitudinal and transverse detents. Electrical scoring and signalling means may be led to at the detents, so as to score or signal with bells, lights or the like upon longitudinal or transverse impact of the bumper elements. The bumper elements may be padded and the frame is sufficiently lightweight so as to be entirely laterally displaceable upon collision or impact.

BRIEF DESCRIPTION OF THE DRAWINGS

FIG. 6 is an end elevation showing the resilient suspension of the bumper upon a reciprocable yoke supported in the frame;

FIG. 8 is an enlarged fragmentary perspective of the detent housing, showing the resilient suspension of the yoke with respect to the frame.

DESCRIPTION OF THE PREFERRED EMBODIMENTS

Figure 1:
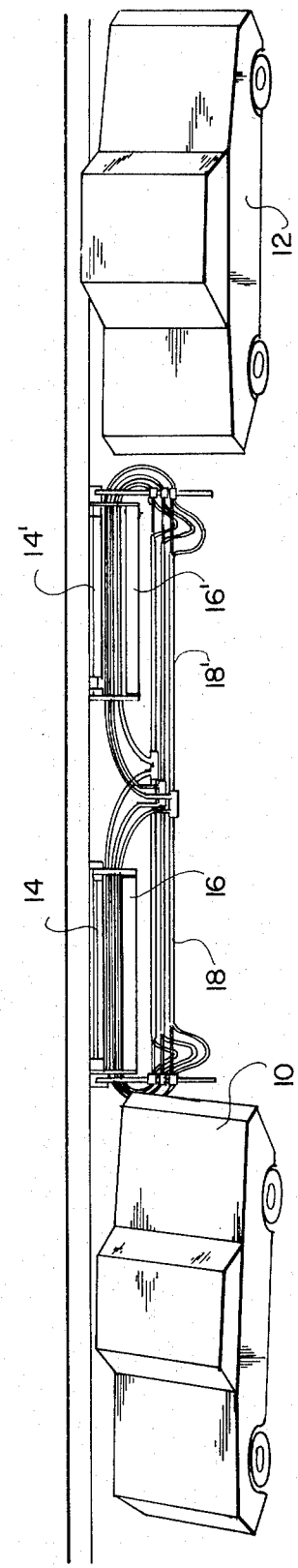
FIG. 1 is a plan view, showing two simulated vehicles defining, together with simulated curb elements, as defined in my co-pending application, a parking space for driver instruction.

In FIG. 1 simulated vehicles 10 and 12 are shown positioned at either end of simulated curb elements 16 and 16' resiliently suspended from base elements 14 and having pressurized air signalling lines 18.

Figure 2:
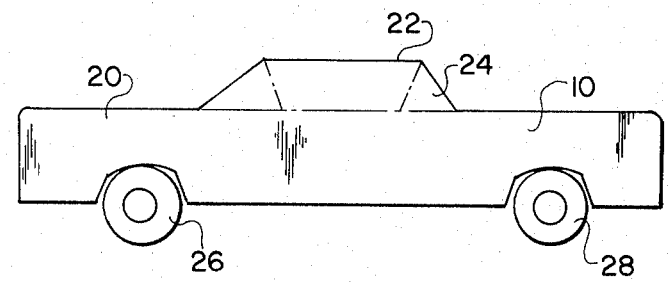
FIG. 2 is a side elevation of the simulated vehicle.
Figure 3:
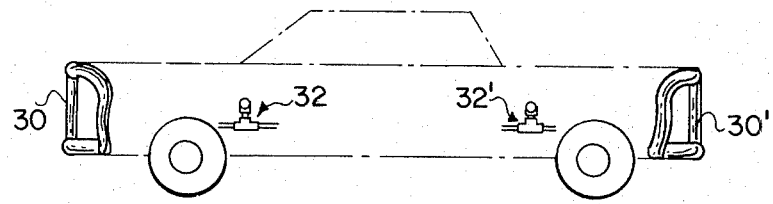
FIG. 3 is a side elevation showing the frame with cover removed.

In FIG. 2 the simulated vehicle 10 is shown in side elevation as comprising a plastic cover 20, translucent panels 24 and a rooftop 22. Lightweight immovable tires 26 and 28, without inner tubes or bearings, may be employed with wheel covers or the like to simulate the vehicle. The vehicle frame is further illustrated in FIG. 3, showing the resilient suspension of the front bumper 30 and identical rear bumper 30' by means of detent housings 32 and 32' supported in the vehicle frame.

Figure 4:
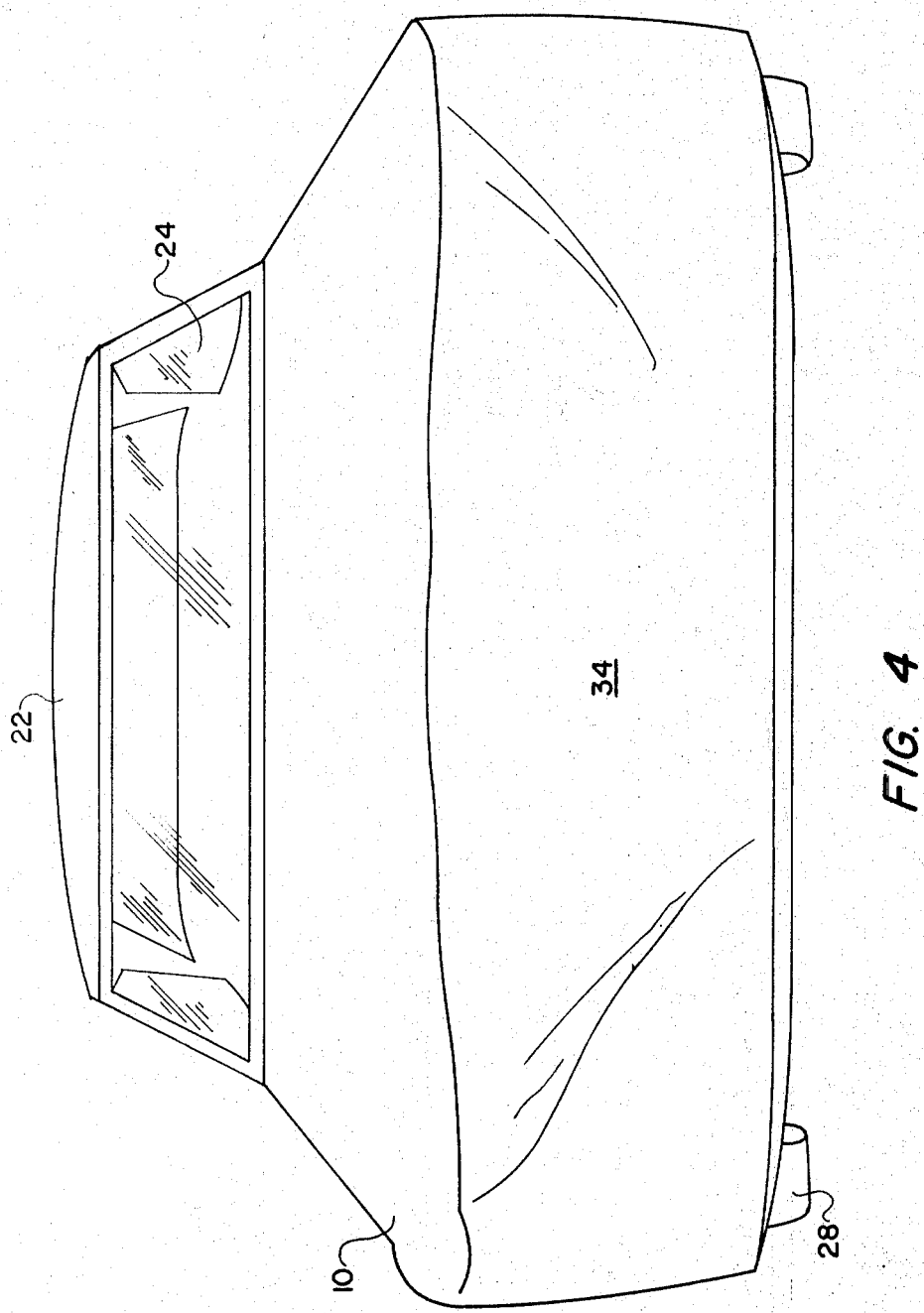
FIG. 4 is an end elevation showing the plastic cover positioned upon the frame.

In FIG. 4 the flexible cover is shown as enclosing the bumper element. The frame and cover are constructed so that either end may be used interchangeably. Thus, if one end is damaged during parking instruction, the simulated vehicle may be rotated upon its longitudinal axis and the front end substituted for the damaged rear end. Manifestly, repair of the damaged end can be continued during driving instruction without any downtime.

In FIG. 6 padded bumper element 30 is illustrated as comprised of top and bottom elements 31 and 33, intermediate arcuate struts 34 and 36 and side curved struts 38 and 40. The bumper 30 is mounted upon a yoke defined by longitudinal strut 48 and converging side struts 41 and 42. The longitudinal strut engages detent housing 50 having a conventional spring actuated detent (not illustrated) in contact with electrical outlet 53 (shown in FIG. 7). Housing 50 is suspended from transverse detent housing 56 encompassing a similar spring actuated detent (not illustrated) in contact with electrical outlet 58. The transverse housing 56 is mounted upon the vehicle frame transverse element 64 and, in turn suspended by tension elements 60 and 62 leading from the clamps 94 and 95 to the frame.

The vehicle frame elements 84, 86 and 88 are basically rigidized with respect to each other although a strap 90 and hasp 52 may be used to tighten the plastic cover over the frame. In addition to the tension elements 60 and 62, side chains 68 and 78 may be suspended from the frame member 86 engaging frame member 84 as at stage brackets 72, 74 and fastened at their lower ends 80, 82 to the bumper 30. This insures a further support of bumper 30 with respect to the simulated vehicle frame.

The simulated vehicle has been trademarked LEM-ON-ZINE.

Figure 7:
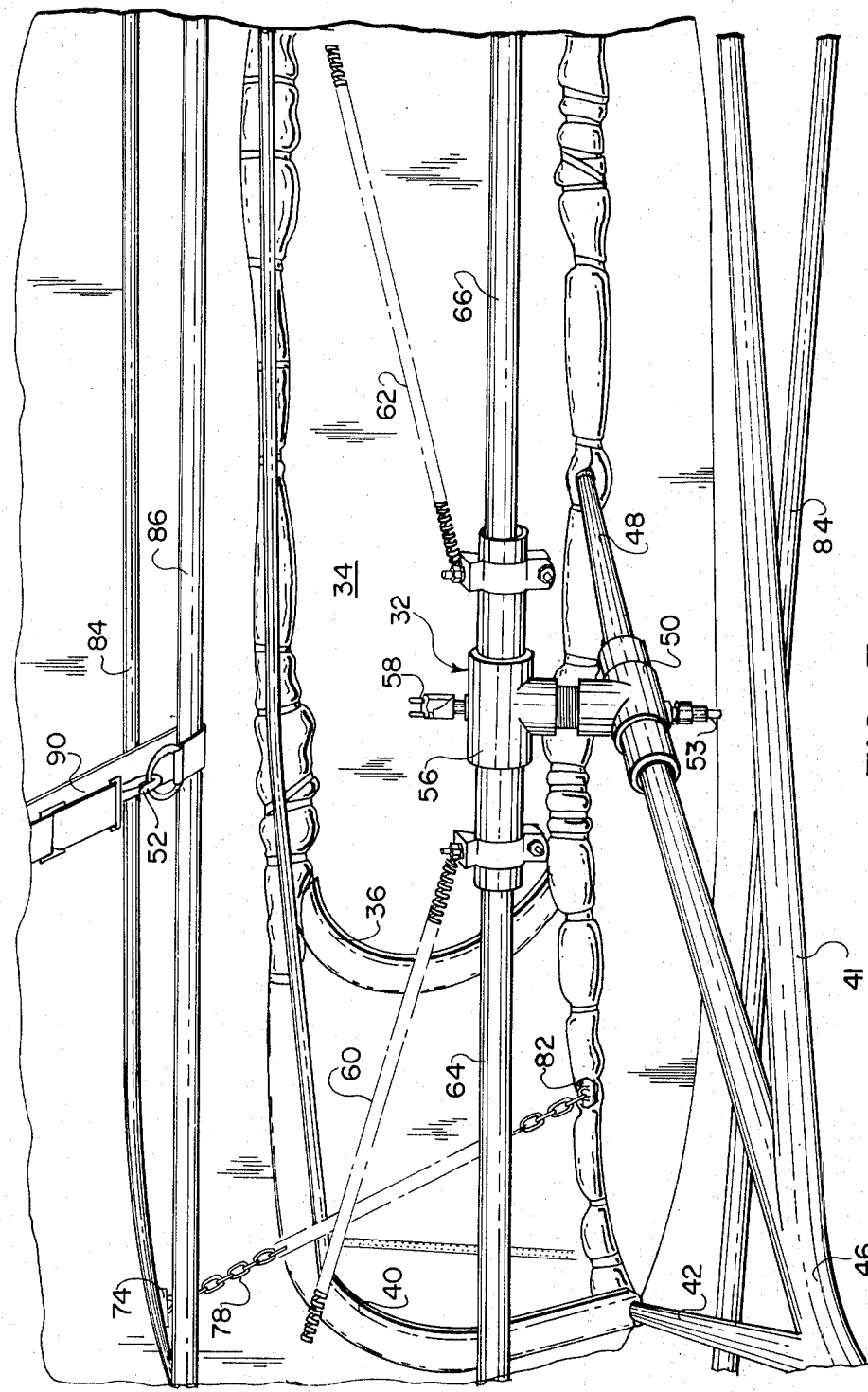
FIG. 7 is an enlarged fragmentary elevation showing the top transverse detent housing and the lower longitudinal detent housing for the bumper yoke.

In FIG. 7 the device is illustrated from the view of the driver's seat, showing the detent housings 32 and 50 in neutral position ready to be activated by a driver trainee automobile 12 backing directly into the hood portion of the simulated vehicle or colliding sideways on either corner of the front bumper area. The tension springs 60, 62 create a lift to help reduce the friction on the sideways thrust and also return the transverse detent switch to its neutral position, so that the "push-on" the switch plunger can recess into the detent 96 (FIG. 8) and thus release the switch and break the current.

Figure 5:
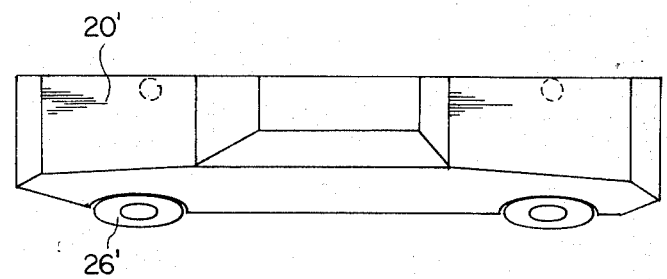
FIG. 5 is a top plan of the modified simulated vehicle having only the outer side completed.

In FIG. 8, the transverse member is shown pushed to the extreme left by sideways collision, thus exposing the detent 96 which is roughly an inch wide and three-sixteenths of an inch deep. Detent 96, of course, could be made larger or smaller, depending upon the accuracy required of the machine. A similar detent is defined in longitudinal shaft 48 but is not illustrated. Simulated vehicles 10 and 12, as illustrated in FIG. 1, would be similarly equipped with resilient bumpers fore and aft so that they might be interchanged and switched according to student damage. The simulated vehicle may be constructed to be within inches of length and height of any desired automobile. The three-sided version illustrated in FIG. 5 is an economy measure and would leave the inner or curb side unfinished.

As shown in FIG. 6 chains 68 and 78 are employed to suspend the weight of the bumper while engaging stages or brackets 72 and 74 secured to the main frame. These stages and frame member 84 may pivot rearwardly 18 to 24 inches in order to respond to the backward movement of the bumper bar upon contact.

Manifestly, the frame, frame cover, bumper and bumper suspending elements may be varied without departing from the spirit of invention.

I claim:

1. A simulated vehicle used in driver training comprising:
   A. a frame generally configured as a vehicle;
   B. a longitudinally reciprocable yoke supported at the end of said frame;
   C. at least one simulated bumper resiliently suspended upon said yoke, said bumper being longitudinally and transversely reciprocable with respect to said frame upon the application of exterior pressure, as in being bumped by another vehicle; and
   D. a flexible cover supported upon said frame as a simulated vehicle exterior.

2. A simulated vehicle as in claim 1, said cover including translucent panels, simulatory of an automobile windshield.

3. A simulated vehicle as in claim 1, including bumper elements resiliently suspended at both ends thereof.

4. A simulated vehicle as in claim 1, said frame being of tubular configuration.

5. A simulated vehicle as in claim 1, including a detent housing supported in said frame and engaging said yoke as a longitudinal control.

6. A simulated vehicle as in claim 5, a portion of said frame supporting said detent being transversely reciprocable with respect to said frame through a transverse detent housing, as upon the application of exterior pressure.

7. A simulated vehicle as in claim 6, said detent housing being resiliently suspended with respect to said frame.

8. A simulated vehicle as in claim 7, said transverse and longitudinal detent housings including exterior electrical circuits communicating with a master signalling and scoring station.

9. A simulated vehicle as in claim 8, including simulated tires, affixed to said frame.

10. A simulated vehicle as in claim 9, said simulated tires including wheel covers.

* * * * *